(12) United States Patent
Ahn (10) Patent No.: US 10,607,100 B2
(45) Date of Patent: Mar. 31, 2020

(54) DEVICE FOR RECOGNIZING VEHICLE LICENSE PLATE NUMBER AND METHOD THEREFOR

(71) Applicant: REXGEN, Jeonju-si, Jeollabuk-do (KR)

(72) Inventor: Soon Hyun Ahn, Anyang-si (KR)

(73) Assignee: REXGEN, Jeonju-si, Jeollabuk-do (KR)

(*) Notice: Subject to any disclaimer, the term of this patent is extended or adjusted under 35 U.S.C. 154(b) by 257 days.

(21) Appl. No.: 15/529,975

(22) PCT Filed: May 11, 2016

(86) PCT No.: PCT/KR2016/004932
§ 371 (c)(1),
(2) Date: May 25, 2017

(87) PCT Pub. No.: WO2016/208870
PCT Pub. Date: Dec. 29, 2016

(65) Prior Publication Data
US 2018/0189588 A1 Jul. 5, 2018

(30) Foreign Application Priority Data

Jun. 26, 2015 (KR) .................. 10-2015-0091130
Apr. 8, 2016 (KR) .................. 10-2016-0043429

(51) Int. Cl.
*G06K 9/32* (2006.01)
*G06K 9/03* (2006.01)
*G06K 9/00* (2006.01)

(52) U.S. Cl.
CPC ......... *G06K 9/325* (2013.01); *G06K 9/00979* (2013.01); *G06K 9/00993* (2013.01); *G06K 9/033* (2013.01); *G06K 2209/15* (2013.01)

(58) Field of Classification Search
CPC .............. G06K 9/323; G06K 9/00979; G06K 9/00993; G06K 9/033
See application file for complete search history.

(56) References Cited

U.S. PATENT DOCUMENTS

| | | | | |
|---|---|---|---|---|
| 6,185,338 | B1* | 2/2001 | Nakamura | G06K 9/2054 382/105 |
| 2012/0148101 | A1* | 6/2012 | Yoon | G06K 9/325 382/103 |

(Continued)

FOREIGN PATENT DOCUMENTS

| | | |
|---|---|---|
| JP | 2006-217067 A | 8/2006 |
| KR | 10-2007-0113334 A | 11/2007 |

(Continued)

OTHER PUBLICATIONS

International Search Report for PCT/KR2016/004932 dated Aug. 24, 2016 from Korean Intellectual Property Office.

*Primary Examiner* — Kim Y Vu
*Assistant Examiner* — Molly Delaney
(74) *Attorney, Agent, or Firm* — Revolution IP, PLLC (57) ABSTRACT

A device for recognizing a vehicle license plate number comprises a division unit for dividing a vehicle license plate image into a plurality of images such that a predetermined area is included in each of the plurality of images; and a distribution management unit for distributing the plurality of divided images to a plurality of recognizing terminals corresponding to each area and receiving the results of recognizing the corresponding area from each of the plurality of recognizing terminals.

8 Claims, 3 Drawing Sheets

(56) References Cited

U.S. PATENT DOCUMENTS

| | | | |
|---|---|---|---|
| 2013/0294652 A1* | 11/2013 | Fan | G06K 9/3258 |
| | | | 382/105 |
| 2013/0294654 A1* | 11/2013 | Burry | G06K 9/34 |
| | | | 382/105 |
| 2014/0348392 A1* | 11/2014 | Burry | G06K 9/325 |
| | | | 382/105 |
| 2015/0163390 A1* | 6/2015 | Lee | H04N 5/2352 |
| | | | 348/149 |
| 2015/0269444 A1* | 9/2015 | Lameyre | G06K 9/00785 |
| | | | 382/104 |

FOREIGN PATENT DOCUMENTS

| | | |
|---|---|---|
| KR | 10-2009-0035798 A | 4/2009 |
| KR | 10-2011-0066748 A | 6/2011 |
| KR | 10-2015-0055652 A | 5/2015 |

* cited by examiner

DEVICE FOR RECOGNIZING VEHICLE LICENSE PLATE NUMBER AND METHOD THEREFOR

CROSS REFERENCE TO PRIOR APPLICATIONS

This application is a National Stage Application of PCT International Patent Application No. PCT/KR2016/004932 filed on May 11, 2016, under 35 U.S.C. § 371, which claims priority to Korean Patent Application Nos. 10-2016-0043429 filed on Apr. 8, 2016, and 10-2015-0091130 filed on Jun. 26, 2015, which are all hereby incorporated by reference in their entirety.

TECHNICAL FIELD

The present invention relates to a device for recognizing a vehicle license plate number and a method therefor.

BACKGROUND ART

Generally, a device for recognizing a vehicle is a device for recognizing a vehicle license plate number by acquiring an image of a vehicle and analyzing the image, and exists in various forms, such as an automated enforcement device (for example, speed or signal violation), a traffic information collection device, a device for recognizing vehicle license plate number for security, a camera for recognizing vehicle license plate number on a highway entrance and exit road, and a parking control device, and numbers and types thereof continuously increase.

A vehicle license plate number recognition rate of the device for recognizing vehicle license plate number is in a level of 95 to 98% at maximum, and it is not able to perfectly recognize the vehicle license plate number with 100% due to limitation of an image processing technology.

Actually, it is fundamentally impossible for a recognition algorithm to have a function of perfectly recognizing a vehicle license plate number with 100% due to various noises of the acquired image, image acquiring environment, and damage, contamination, artificial occlusion or the like of a vehicle license plate.

However, unrecognized or misread data of 2 to 5% is generated even in a vehicle license plate number recognition algorithm with the best performance, this is limitation of an original purpose of using the device for recognizing vehicle license plate number, and it is impossible for a current technology to do such a thing or it requires enormous cost and time.

For example, the number of vehicles acquired by a camera of the device for recognizing a vehicle license plate number installed in a city 'S' of a metropolitan area is approximately 700,000 vehicles per day, and even if a system operates in an optimal state (a recognition rate of 95 to 98%), that are approximately 14,000 to 35,000 vehicles per day which fail to be recognized.

In such a situation, in case where a search for vehicle license plate numbers are required for one month, there is a problem that an operator has to identify approximately 420,000 to 1,050,000 vehicles with the naked eye.

Since a task of recognizing the images with the naked eye is monotonous, it is easy to lose attention, and even if one person searches 20,000 vehicles per day, it takes about 21 to 50 days. Hence, it is actually impossible for a police officer in charge of investigation to quickly and accurately search for the vehicles in a mastered state. That is, the task of recognizing the images with the naked eye requires considerable time and cost.

DISCLOSURE

Technical Problem

An object of the present invention is to provide a device for recognizing a vehicle license plate number and a method therefor which can protect a driver's privacy, maintain security of vehicle information, and quickly recognize a large amount of information while eliminating possibility of deliberate misjudgment/omission of a reader, in case where the reader has to recognize a vehicle license plate image with the naked eye.

Technical Solution

According to an embodiment of the present invention, a device for recognizing vehicle license plate number is provided. The device for recognizing a vehicle license plate number includes a division unit for dividing a vehicle license plate image into a plurality of images such that a predetermined area is included in each of the plurality of images; and a distribution management unit for distributing the plurality of divided images to a plurality of recognizing terminals corresponding to each area and receiving the results of recognizing the corresponding area from each of the plurality of recognizing terminals.

The division unit may divide the vehicle license plate image such that at least one area of a vehicle type, usage, a serial number, and a competent authority is included.

The device for recognizing a vehicle license plate number may further include a mergence unit for generating a predetermined vehicle license plate number on the basis of the recognizing results.

The division unit may assign an identifier for identifying the divided image to the divided image.

The mergence unit may generate the predetermined vehicle license plate number by merging the recognizing results on the basis of the identifier.

The distribution management unit may randomly distribute the plurality of divided images to the plurality of recognizing terminals.

The distribution management unit may record and manage at least one of information of the recognizing terminals, time information on the divided image which is transmitted, location information of the recognizing terminals, and the number of recognizing which is processed by the recognizing terminals.

The recognizing terminal may transmit the results of recognizing the divided images using an image processing algorithm previously stored, or transmit the recognizing results received from a user to the device for recognizing a vehicle license plate number.

According to another embodiment of the present invention, a method for recognizing a vehicle license plate number using a device for recognizing a vehicle license plate number is provided. The method for recognizing a vehicle license plate number includes a step of dividing a vehicle license plate image into a plurality of images such that a predetermined area is included in each of the plurality of images; a step of distributing the plurality of divided images to a plurality of recognizing terminals corresponding to each area; and a step of receiving the results of recognizing the corresponding area from each of the plurality of recognizing terminals.

In the step of dividing, the vehicle license plate image may be divided such that at least one area of a vehicle type, usage, a serial number, and a competent authority is included.

The method for recognizing a vehicle license plate number may further include a step of generating a predetermined vehicle license plate number on the basis of the recognizing results.

In the step of dividing, an identifier for identifying each of the plurality of divided images may be assigned.

In the step of generating, the vehicle license plate number may be generated by merging the recognizing results received from the plurality of recognizing terminals on the basis of the identifier.

In the step of distributing, the plurality of divided images may be randomly distributed to the plurality of recognizing terminals.

In the step of receiving the recognizing results, at least one of information of the recognizing terminals, time information on the divided image which is transmitted, location information of the recognizing terminals, and the number of recognizing which is processed by the recognizing terminals may be recorded.

Advantageous Effects

According to the embodiment of the present invention, divided images of a vehicle license plate image are distributed to readers located in different regions, and thereby, the possibility of violating a driver's privacy may be prevented and a reader is prevented from seeing an image of a driver and a passenger in the predetermined area of a vehicle.

In addition, it is possible to basically block deliberate recognition omission or misidentification of the reader. Accordingly, there are effects that may considerably improve an ineffective portion of a recognizing task of a police officer who causes a high cost, and more quickly do the recognizing task.

In addition, it is possible to more efficiently recognize the vehicle license plate number through division/distribution/collection methods with respect to an unrecognized vehicle license plate, and to effectively improve recognizing performance of the unrecognized vehicle license plates corresponding to 2 to 3% of the total vehicle license plates.

MODE FOR INVENTION

Hereinafter, embodiments of the present invention will be described in detail with reference to the attached drawings such that those skilled in the art to which the present invention belongs may easily perform.

However, the present invention may be embodied in many different forms and is not limited to the embodiments set forth herein. In addition, parts regardless of the description are omitted to clearly describe the present invention, and similar symbols or reference numerals will be attached to similar units throughout the specification.

Figure 1:
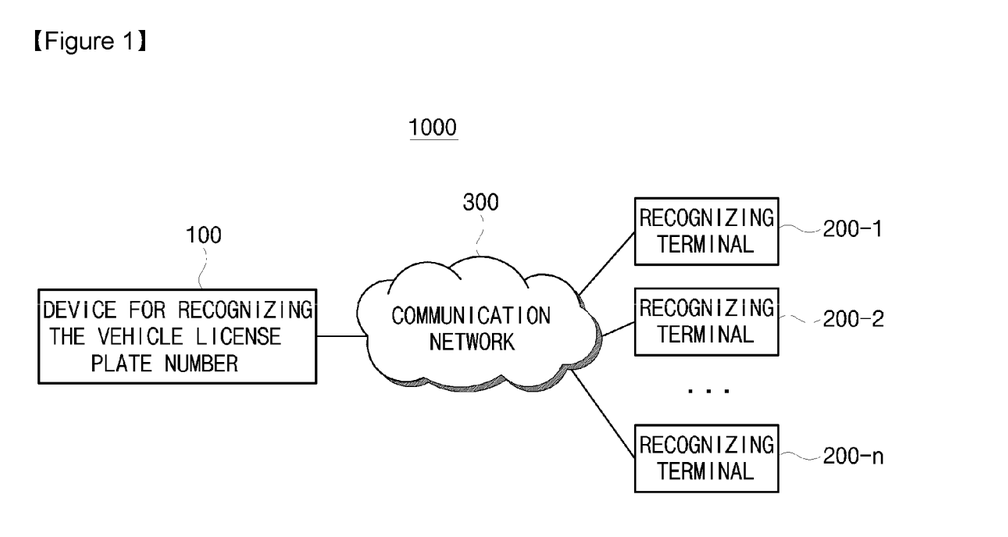
FIG. 1 illustrates a system for recognizing a vehicle license plate number according to an embodiment of the present invention.

FIG. 1 illustrates a system for recognizing a vehicle license plate number according to an embodiment of the present invention.

As illustrated in FIG. 1, the system 1000 for recognizing the vehicle license plate number according to the embodiment of the present invention includes a device 100 for recognizing the vehicle license plate number and a plurality of recognizing terminals 200-1, 200-2, . . . , and 200-$n$.

The device 100 acquires (detects) a vehicle license plate image (including a vehicle license plate) of a vehicle to process the vehicle license plate image, and automatically recognizes the vehicle license plate image using a recognition algorithm. Here, a technique of recognizing the vehicle license plate number using the recognition algorithm is a well-known technique, and detailed description thereof will be omitted in the present specification.

In case of failing to recognize the vehicle license plate number, the device 100 divides an image (hereinafter, referred to as 'unrecognized vehicle license plate image') of the vehicle license plate whose recognition fails into a plurality of images such that a predetermined area is included in each of the plurality of images. Each divided image is an image including the predetermined area in the vehicle license plate image.

In addition, the device 100 distributes a plurality of divided images to the recognizing terminals 200 corresponding to each area through a communication network 300. Here, it is preferable that the vehicle license plate image which is processed by the device 100 is an image (that is, the vehicle license plate image) including the vehicle license plate number among vehicle images.

The recognizing terminals 200 receives the divided images from the device 100 provides the received divided images to a user. Thereafter, the recognizing terminal 200 receives information obtained by recognizing the divided images from the user, and transmits the information input through the communication network to the device 100. In addition, the recognizing terminal 200 may recognize the received divided image using an image processing algorithm previously stored and transmit the recognized information to the device 100.

At this time, it is preferable that the recognizing terminals 200 are located in different areas (for example, a competent authority area). For example, each of the recognizing terminals 200 may be located in Seoul, Gyeongsangnam-do, Jeollabuk-do, and the like.

The device 100 uses recognizing results received from each of the recognizing terminals 200 to determine a vehicle license plate number for the unrecognized vehicle license plate image.

The communication network 300 is a network which connects the device 100 to the recognizing terminal 200 and may be realized as a form of a LAN (Local Area Network) or a WAN (Wide Area Network).

Configurations of the device 100 and the recognizing terminals 200 will be described in detail with reference to FIG. 2 and FIG. 3.

Figure 2:
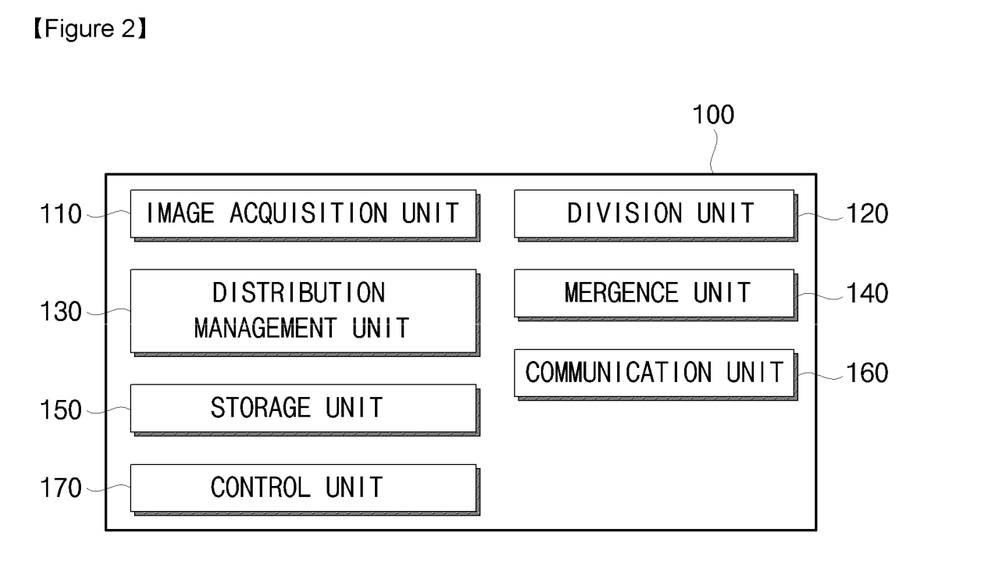
FIG. 2 is a block diagram illustrating a device for recognizing a vehicle license plate number according to the embodiment of the present invention.

FIG. 2 is a block diagram illustrating the device for recognizing the vehicle license plate number according to the embodiment of the present invention.

As illustrated in FIG. 2, the device 100 according to the embodiment of the present invention includes an image acquisition unit 110, a division unit 120, a distribution management unit 130, a mergence unit 140, a storage unit 150, a communication unit 160, and a control unit 170.

The image acquisition unit 110 automatically detects the vehicle license plate image from a vehicle image or acquires the vehicle license plate image as a vehicle license plate area is selected by a user.

At this time, the vehicle license plate image includes a vehicle license plate which is generally used. Here, the vehicle license plates exist in various forms in accordance with a number plate type, and each vehicle license plate includes vehicle type information, usage information, serial number information, and competent authority information.

Meanwhile, the image acquisition unit 110 may recognize the vehicle license plate number of the vehicle license plate through the recognition algorithm, and if the recognition of the vehicle license plate number fails, the image acquisition unit 110 transmits the unrecognized (failed) vehicle license plate image to the division unit 120.

The division unit 120 divides the unrecognized vehicle license plate image into a plurality of images in accordance with a form of the vehicle license plate, and each of the divided images is a part of the unrecognized vehicle license plate image and includes an image identifier (for example, characters, numbers) for distinguish the divided images.

Specifically, the division unit 120 divides the unrecognized vehicle license plate image into a plurality of number plate images in accordance with the form of the vehicle license plate such that at least one information area of vehicle type information, usage information, serial number information, and competent authority information is included. That is, the division unit 120 may determine a division area (or division boundary) on the basis of the form of the vehicle license plate.

For example, the division unit 120 may determine a location of each information area in the unrecognized vehicle license plate image, in accordance with the form (for example, a ratio between a width and a length of the vehicle license plate, a background color, a character color, character concentration, and the like) of the vehicle license plate included in the unrecognized vehicle license plate image.

In addition, the division unit 120 may determine the location of each information area, and thereafter, divide the unrecognized vehicle license plate image into a plurality of images in accordance with a predetermined division standard. For example, in case where the unrecognized vehicle license plate image is "Seoul 32 ba 3214" and the division standard is 'competent authority+vehicle type' and 'usage+serial number', the division unit 120 may divide the image of "Seoul 32 ba 3214" into a first image including 'Seoul 32' and a second image including 'ba 3214'.

In addition, the division unit 120 may divide the image into 'Seoul', '32', 'ba', and '3214'.

Of course, the division unit 120 may divide the image such that the divided image includes at least one piece of information, even in case where the vehicle license plate includes only three pieces of information, that is, vehicle type information, usage information, and serial number information. For example, in case where the unrecognized vehicle license plate image is "01 ga 3274", the division unit 120 may divide the image such that at least one area of '01', 'ga', and '3274' is included in each of the divided images.

Accordingly, the division unit 120 may divide the vehicle license plate image into a plurality of images on the basis of locations of the respective information areas (a vehicle type information area, a usage information area, a serial number information area, and a competent authority information area) existing in the vehicle license plate image.

In addition, the division unit 120 assigns an image identifier (for example, an ID or a code) for identifying each divided image to each divided image. At this time, the division unit 120 may assign the image identifier for identifying each divided image, while indicating that a plurality of divided images relates (for example, a division relationship, a mother-child relationship) to one unrecognized vehicle license plate image.

For example, the assignment unit 120 may assign an 'A1' value to one image of two divided images divided from the unrecognized vehicle license plate image having an 'A' identifier as an image identifier, and assign an 'A2' value to the other image as an image identifier.

Meanwhile, when an image dividing operation is performed, the division unit 120 does not divide one character included in the unrecognized vehicle license plate image into the plurality of images (for example, 'ba' 'b' and 'a', or 'Seoul'→'Seo', 'ul'). Of course, when dividing the image fails, it is preferable to divide the image on the basis of dividing information which is input from a manager.

The distribution management unit 130 randomly distributes the plurality of divided images which are divided by the division unit 120 to the recognizing terminals 200 and retrieves the recognizing results corresponding to the divided images from the recognizing terminals 200.

At this time, the distribution management unit 130 may record and manage recognizing-related information generated in distribution and retrieve processes. Here, the recognizing-related information includes information of the recognizing terminal 200 (for example, a terminal identifier, information of a reader), assignment information to the reader, the number/time processed by the reader, a filename of the divided image processed by the reader, the time when the divided image is transmitted to the reader, a location of the reader, and the assignment ratio depending on the reader.

In addition, the distribution management unit 130 may transmit the plurality of divided images to the recognizing terminals 200 located in different areas.

For example, in case where the recognizing terminal 200-1 is located in Kyungsangnam-do and the other recognizing terminal 200-2 is located in Seoul, the distribution management unit 130 may transmit two divided images divided from one unrecognized vehicle license plate image to the recognizing terminals 200-1 and 200-2, respectively.

At this time, it is preferable that the distribution management unit 130 assigns an identifier for identifying the recognizing terminals 200 and manages the recognizing terminals 200 on the basis of the identifier. In addition, the distribution management unit 130 receives the recognizing results from the recognizing terminals 200 in correspondence with the divided image, and arranges the received recognizing result on the basis of a terminal identifier and an image identifier to provide the recognizing results to a manager.

The mergence unit 140 merges (or integrates) the recognizing results received from the recognizing terminals 200 to generate a vehicle license plate number. At this time, the mergence unit 140 merges (or integrates) the recognizing results using the image identifiers.

For example, in case where the image identifier (or an image identifier included in the recognized information)

corresponding to the recognized information (for example, 'Seoul 32') received from the recognizing terminal 200-1 is 'A1' and the image identifier corresponding to the recognized information (for example, 'ba 3214') received from the recognizing terminal 200-2 is 'A2', it is possible to determine that the recognized information ('Seoul 32') of the recognizing terminal 200-1 and the recognized information ('ba 3214') of the recognizing terminal 200-2 are information related to one unrecognized vehicle license plate image.

Hence, the mergence unit 140 merges (integrates) the verified recognized information ('Seoul 32' and 'ba 3214') using the corresponding image identifiers ('A1', 'A2'), generates one piece of perfect vehicle information ('Seoul 32 ba 3214'), matches the information with the unrecognized vehicle license plate image, and stores in the storage unit 150.

The storage unit 150 stores and manages the vehicle information generated by the mergence unit 140.

The communication unit 160 is controlled by the control unit 170 and performs wired or wireless communication with the recognizing terminals 200.

The control unit 170 controls the image acquisition unit 110, the division unit 120, the distribution management unit 130, the mergence unit 140, the storage unit 150, and the communication unit 160, and manages data flows between each unit 110, 120, 130, 140, 150 and 160.

At this time, the control unit 170 includes a temporary storage unit (omitted) to temporarily store information related to an operation of the control unit 170.

Figure 3:
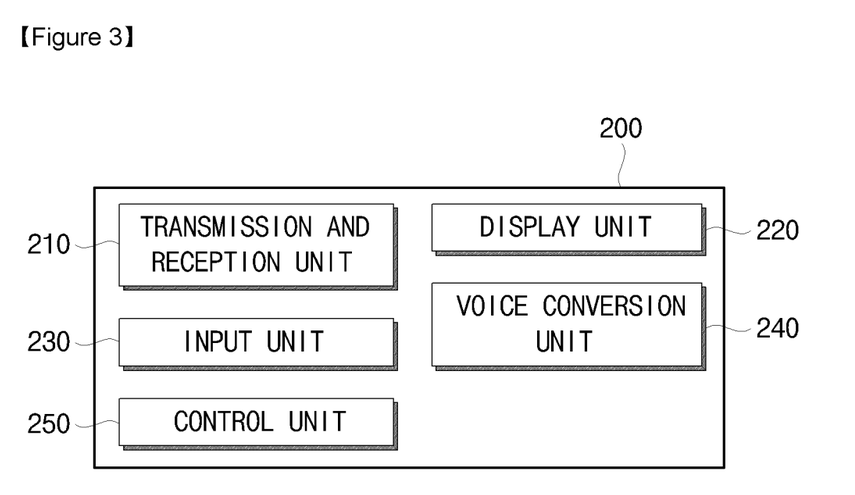
FIG. 3 is a block diagram illustrating a recognizing terminal according to the embodiment of the present invention.

FIG. 3 is a block diagram illustrating the recognizing terminal according to the embodiment of the present invention. The recognizing terminal 200 includes a transmission and reception unit 210, a display unit 220, an input unit 230, a voice conversion unit 240, and a control unit 250.

The transmission and reception unit 210 receives the divided images of the unrecognized vehicle license plate image from the device 100 through the communication network 300, and transmits the vehicle information received from a user to the device 100.

The display unit 220 displays the divided images on a screen such that a reader of the recognizing terminal 200 may see the divided images.

The input unit 230 receives recognized information corresponding to the divided image from the reader through an input interface (for example, a virtual keyboard or the like). For example, in case where 'Seoul 32' is included in the divided image, the input unit 230 may receive 'Seoul 32' from the reader. In addition, the input unit 230 may also receive vehicle characteristic information from the reader and store the information.

At this time, the input interface may be configured differently depending on a form of the divided image (or information included in the divided image). For example, in case where the divided image includes competent authority information and a vehicle type information, the input interface may be configured to be optimized to input of symbols and numerals of a competent authority. In addition, in case where the divided image includes the vehicle type information and serial number information (for example, in case where the divided image is configured by numerals), the input interface may be configured to be optimized for numeral input. In addition, in case where the divided image includes the competent authority information and usage information, the input interface may be configured to be optimized for character input.

Of course, the input interface may also be optimized to one form and provided to a reader.

Accordingly, the recognizing terminal 200 may receive recognized information using the input interface optimized for the form of the divided image that the recognizing terminal 200 are responsible for, and thereby processing speed and efficiency may be further increased.

The voice conversion unit 240 converts the recognized information received through the input unit 230 into voice and outputs the voice.

The control unit 250 controls the transmission and reception unit 210, the display unit 220, the input unit 230, and the voice conversion unit 240, and manages a data flow between the respective units (210, 220, 230, and 240).

Meanwhile, the recognizing terminal 200 according to the embodiment of the present invention may be realized as a program for receiving the divided images from the device 100 for recognizing the vehicle license plate number and transmitting the recognized information corresponding thereto to the device 100 for recognizing the vehicle license plate number. That is, the recognizing terminal 200 may recognize the divided images received from the device 100 using an image processing algorithm previously stored and transmit the recognizing results to the device 100.

Of course, the recognizing terminal 200 may also be a device, in which a predetermined program may be installed, such as a tablet PC or a smart phone.

Figure 4:
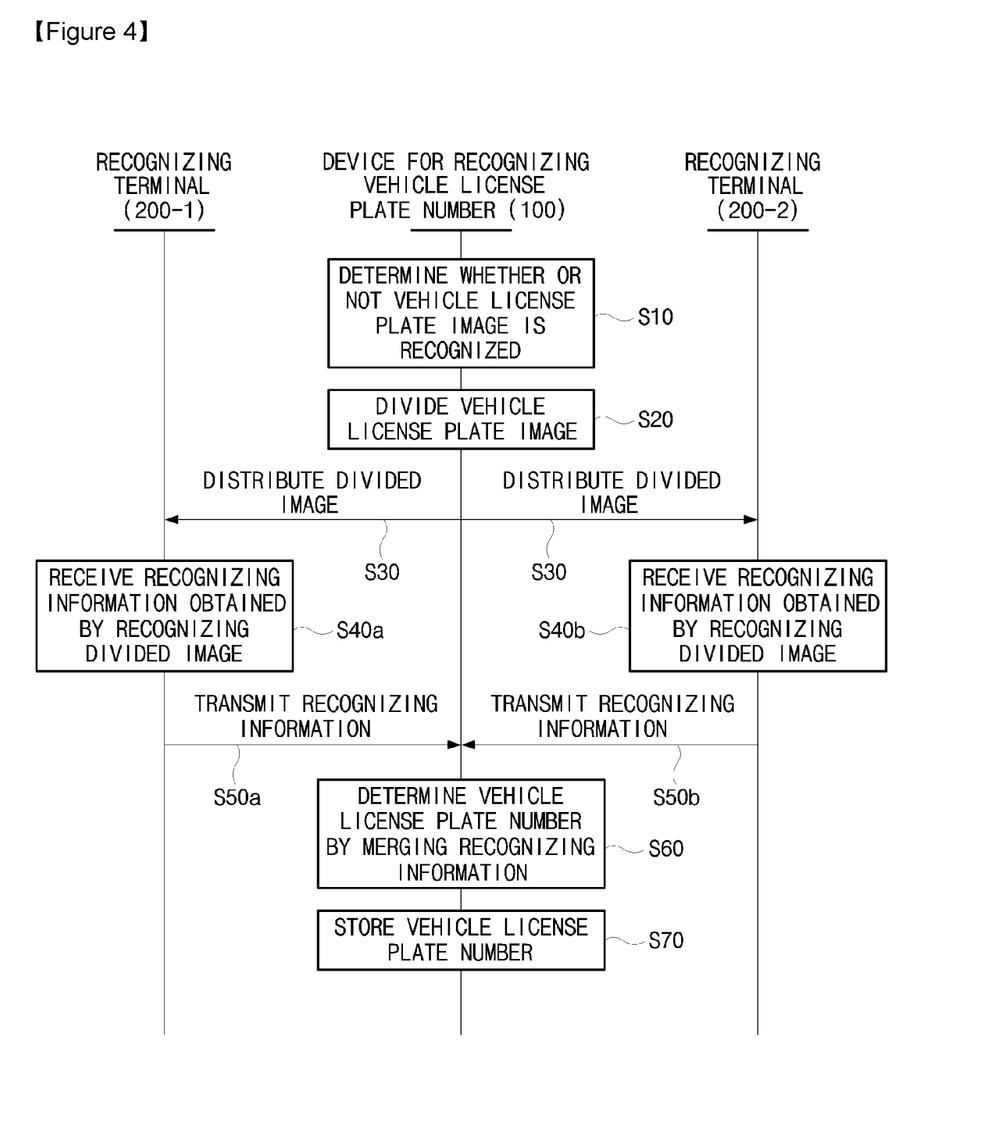
FIG. 4 is a sequence diagram illustrating processes that the system for recognizing the vehicle license plate number according to the embodiment of the present invention reads the vehicle license plate number.

FIG. 4 is a sequence diagram illustrating processes that a system for recognizing the vehicle license plate number according to the embodiment of the present invention reads the vehicle license plate number. In FIG. 4, for the sake of convenience of description, a case where the division unit 120 divides an unrecognized vehicle license plate image into two images will be described as an example.

In addition, a case where the recognizing terminal 200-1 is located in Kyungsangnam-do and the recognizing terminal 200-2 is located in Chungcheongbuk-do is assumed in FIG. 4.

As illustrated in FIG. 4, the device 100 acquires a vehicle license plate image (for example, "Seoul 32 ba 3214") and recognizes the vehicle license plate number of the vehicle license plate image through a recognition algorithm (S10).

In case of failing to recognize the vehicle license plate number, the device 100 divides the unrecognized vehicle license plate image into two images (S20).

Specifically, the device 100 may determine a divided region (or a divided boundary) through a division algorithm based on the form of the vehicle license plate. For example, in case where the vehicle license plate of the unrecognized vehicle license plate image has a long shape in a horizontal direction and a background color thereof is yellow and a character color thereof is black, the device 100 may determine positions of a vehicle type information area, a usage information area, a serial number information area, and a competent authority information area within the unrecognized vehicle license plate image, based on the character concentration.

After determining the positions of each information area, the device 100 may divide the unrecognized vehicle license plate image according to a predetermined division standard (for example, a competent authority+vehicle type, usage+serial number). For example, the device 100 may divide the unrecognized vehicle license plate image as an image (first divided image) including 'Seoul 32' and an image (second divided image) including 'ba 3214'.

The device 100 distributes the first divided image to the recognizing terminal 200-1 and distributes the second divided image to the recognizing terminal 200-2 (S30). That is, the device 100 distributes the first divided image and the second divided image to the recognizing terminals 200-1 and 200-2 corresponding to the respective areas.

The recognizing terminals 200-1 and 200-2 display the divided images which are transmitted on a screen and receive the results of recognizing the corresponding divided images from readers (S40a, S40b). For example, the recognizing terminal 200-1 receives 'Seoul' and '32' included in the first divided image from the reader, and the recognizing terminal 200-2 receives 'ba' and '3214' included in the second divided image from the reader.

The recognizing terminals 200-1 and 200-2 transmit the recognizing information received from the readers to the device 100 for recognizing the vehicle license plate number (S50a, S50b). At this time, the recognizing information may include an image identifier of the first divided image or the second divided image and a terminal identifier of the recognizing terminals 200-1 and 200-2.

The device 100 merges the recognizing information received from the recognizing terminals 200-1 and 200-2 using the image identifiers of the first divided image and the second divided image to generate one vehicle license plate number ("Seoul 32 ba 3214") (S60).

The device 100 for recognizing the vehicle license plate number stores the vehicle license plate number ("Seoul 32 ba 3214") generated in step S60 (S70).

As described above, after dividing the unrecognized vehicle license plate image into a plurality of images, the device 100 according to the embodiment of the present invention distributes the divided images to the recognizing terminals 200 through a network. The recognizing terminals 200 receive the recognizing information corresponding to the divided images from the readers and transmit the recognizing information to the device 100.

Thereafter, the device 100 retrieves the recognizing information from the recognizing terminals 200 and manages history information on the readers of the recognizing terminals 200.

According to the system 1000 for recognizing the vehicle license plate number of the embodiment of the present invention, the recognizing terminals 200 connected to each other through a network recognize divided images of an unrecognized vehicle license plate image, and thereby, privacy of a driver may be protected. In addition, the recognizing terminals 200 may quickly recognize a large amount of information using the network, and may recognize the vehicle license plate image in a state where security of the vehicle license plate information may be maintained.

Meanwhile, embodiments of the present invention are described by using a vehicle license plate of an automobile as an example, but those are only examples. The present invention may be applied not only to an automobiles but also to a case of recognizing license plate number plates of other types of vehicles (for example, two-wheeled vehicle) or transportation means. In addition, the present invention is not limited to the system for recognizing the vehicle license plate number, but also may be applied to the entire system for recognizing an image.

Although the present invention is described with reference to the embodiments illustrated in the drawings, the embodiments are only examples, and those skilled in the art will understand that various modifications and other equivalent embodiments will be made from the embodiments. Accordingly, the true scope of the present invention should be determined by a technical idea of the appended claims.

The invention claimed is:

1. A device for recognizing a vehicle license plate number, the device being communicated with a plurality of terminals, the device comprising:
   at least one or more units, communicated with the plurality of terminals, the one or more units being configured and executed by a processor using an algorithm associated with least one non-transitory storage device, the units comprising,
   division unit, executed by the processor, for dividing a vehicle license plate image into a plurality of images such that a predetermined area is included in each of the plurality of images and assigning an identifier to each divided image;
   a distribution management unit, executed by the processor, for randomly distributing the plurality of divided images to the plurality of terminals and receiving the results of recognizing the divided image from each of the plurality of terminals; and
   a mergence unit, executed by the processor, for generating a predetermined vehicle license plate number by merging the recognizing results on the basis of the identifier.

2. The device for recognizing a vehicle license plate number according to claim 1, wherein the division unit divides the vehicle license plate image such that at least one area of a vehicle type, usage, a serial number, and a competent authority is included.

3. The device for recognizing a vehicle license plate number according to claim 1, wherein the distribution management unit records and manages at least one of information of the terminals, time information on the divided image which is transmitted, location information of the terminals, and the number of recognizing which is processed by the terminals.

4. The device for recognizing a vehicle license plate number according to claim 1, wherein the recognizing terminal transmits the results of recognizing the divided images using an image processing algorithm previously stored, or transmits the recognizing results received from a user to the device for recognizing a vehicle license plate number.

5. A computer-implemented method for recognizing a vehicle license plate number using a device for recognizing a vehicle license plate number, the method comprising:
   a step of dividing a vehicle license plate image into a plurality of images such that a predetermined area is included in each of the plurality of images and assigning an identifier to each divided image;
   a step of randomly distributing the plurality of divided images to a plurality of terminals;
   a step of receiving the results of recognizing the divided image from each of the plurality of terminals; and
   a step of generating a predetermined vehicle license plate number by merging the recognizing results on the basis of the identifier.

6. The method for recognizing a vehicle license plate number according to claim 5, wherein, in the step of dividing, the vehicle license plate image is divided such that at least one area of a vehicle type, usage, a serial number, and a competent authority is included.

7. The method for recognizing a vehicle license plate number according to claim 5, wherein, in the step of receiving the recognizing results, at least one of information of the terminals, time information on the divided image which is transmitted, location information of the terminals, and the number of recognizing which is processed by the terminals is recorded.

8. The method for recognizing a vehicle license plate number according to claim 5, wherein the recognizing terminal transmits the results of recognizing the divided images using an image processing algorithm previously stored, or transmits the recognizing results received from a user to the device for recognizing a vehicle license plate number.

\* \* \* \* \*